INVENTOR.
OPTON F. SMITH
BY Oldham Williams
ATTYS.

May 21, 1968     O. F. SMITH     3,383,783

TRACTOR TYPE TRENCHING APPARATUS

Filed Oct. 14, 1964     3 Sheets-Sheet 2

INVENTOR.
OPTON F. SMITH

BY *Oldham & Oldham*

ATTYS.

May 21, 1968     O. F. SMITH     3,383,783

TRACTOR TYPE TRENCHING APPARATUS

Filed Oct. 14, 1964     3 Sheets-Sheet 3

INVENTOR.
OPTON F. SMITH
BY *Oldham & Oldham*

ATTYS.

Patented May 21, 1968

1

3,383,783
TRACTOR TYPE TRENCHING APPARATUS
Opton F. Smith, 6000 N. Tamiami Trail,
Sarasota, Fla. 33580
Filed Oct. 14, 1964, Ser. No. 403,786
5 Claims. (Cl. 37—81)

ABSTRACT OF THE DISCLOSURE

Apparatus adapted for ready attachment to a tractor to perform trenching or ditching operations when pulled behind the tractor by employing a rotary vertically positioned screw having a substantially half-round housing closely surrounding about the full back half of the screw with the edges of the screw extending laterally beyond the edges of the housing, which apparatus has a three-pointed attachment to the tractor and wherein the entire apparatus is mounted for a floating movement about a horizontal pivot in the connection to the tractor with the apparatus riding on a substantially horizontal footer plate which engages the bottom of the ditch as cut. Further, the screw terminates at its upper end in a radially directed paddle for centrifically throwing the dirt dug by the screw with removable fillet plates joining the upper end of the screw with radially directed paddles, which plates can be readily replaced when worn.

This invention relates to apparatus adapted for ready attachment to a tractor and adapted to perform trenching or ditching operations in ground, fields, and the like when pulled behind the tractor.

There is a considerable demand in many parts of the United States and the world for a durable, operative, and relatively inexpensive attachment for a tractor which will cut relatively shallow drainage or irrigation ditches in agricultural fields of a wide variety of types. There is also a considerable demand for apparatus of the indicated type which will dig a trench for laying plastic pipe, wires, or the like. However, known apparatus has been open to various objections including initial costs, breakdown in use, high maintenance costs, slowness of operation and the like.

It is the general object of the present invention to avoid and overcome the foregoing and other difficulties of and objections to prior known apparatus by the provision of relatively simple, inexpensive, durable, low maintenance apparatus capable of ready attachment to an ordinary farm tractor of the power take-off type, and which will perform to rapidly and efficiently cut a ditch or trench of the type desired.

Another object of the invention is the provision of apparatus of the character described and employing a rotating vertically positioned screw or auger having a substantially half-round housing closely surrounding about the back half of the screw, but with the edges of the screw extending laterally beyond the edges of the housing.

Another object of the present invention is to provide trenching and ditching apparatus for three point attachment to a tractor wherein the entire apparatus is mounted for floating movement about horizontal pivots in the connection to the tractor, and with the apparatus riding upon a substantially horizontal footer plate which engages the bottom of the ditch as cut.

Another object of the invention is to provide apparatus of the type described including a screw which terminates at its upper end in a radially directed paddle for centrifugally throwing the dirt dug by the screw, with removable fillet plates joining the upper end of the screw with the radially directed paddle, which fillet plates can be readily replaced when worn.

Another object of the invention is to provide in tractor type trenching apparatus a vertically positioned rotary screw having the upper end of each screw flight terminating in a radially directed paddle, a casing surrounding the paddle, an extension of the casing surrounding the upper portion of the screw, a substantially half-round housing surrounding the rear half of the lower portion of the screw, a substantially horizontal footer plate secured to the lower end of the housing, and with web-like strengthening means connecting the footer plate, the extension, the casing, and the main frame of the apparatus all at the rear thereof in the direction of movement of the apparatus in use.

Another object of the invention is the provision of ditching apparatus for use in conjunction with a tractor, and including a rotary screw positioned in a casing over at least part of the length of the screw, the casing being provided with readily removable and replaceable liner parts.

The foregoing objects of the invention, and other objects which will become apparent as the description proceeds, are achieved by the provision of a trenching apparatus for three point attachment to a tractor including a frame, pivotal means on the lower front of the frame for attachment to the lower links of the tractor, pivotal means on the upper front of the frame for attachment to the upper link of the tractor, a right angle gear box carried above the frame and having one shaft extending downwardly and a second shaft extending forwardly, an adjustable slip clutch connected to said second shaft, a universal drive shaft connected to the slip clutch and adapted to be connected to the power take-off of the tractor, a multi-flight screw, a bearing journalling the upper end of the screw shaft in the frame in alignment with said one shaft, resilient means coupling the screw to said one shaft, a cylindrical casing on the frame having lateral openings and surrounding the upper end of the screw shaft below the bearing, radially-directed paddles each connected to the upper end of a screw flight and on the screw shaft in the casing and adapted to throw dirt centrifugally through the openings, adjustably positioned deflectors over the openings, a cylindrical downward extension of the casing surrounding the upper end of the screw, a truncated conical half-round housing of less diameter than the screw connected to the bottom of the extension and surrounding the back of the lower portion of the screw, a footer plate on the bottom of the housing, a bearing on the plate supporting the lower end of the screw, means connecting the back of the footer plate, housing, extension, casing and frame to strengthen the assembly, removable liner means for at least the extension of the casing, and removable fillet means positioned in the corners between each paddle and the end of each screw flight.

For a better understanding of the invention reference should be had to the accompanying drawings wherein.

Figure 1:
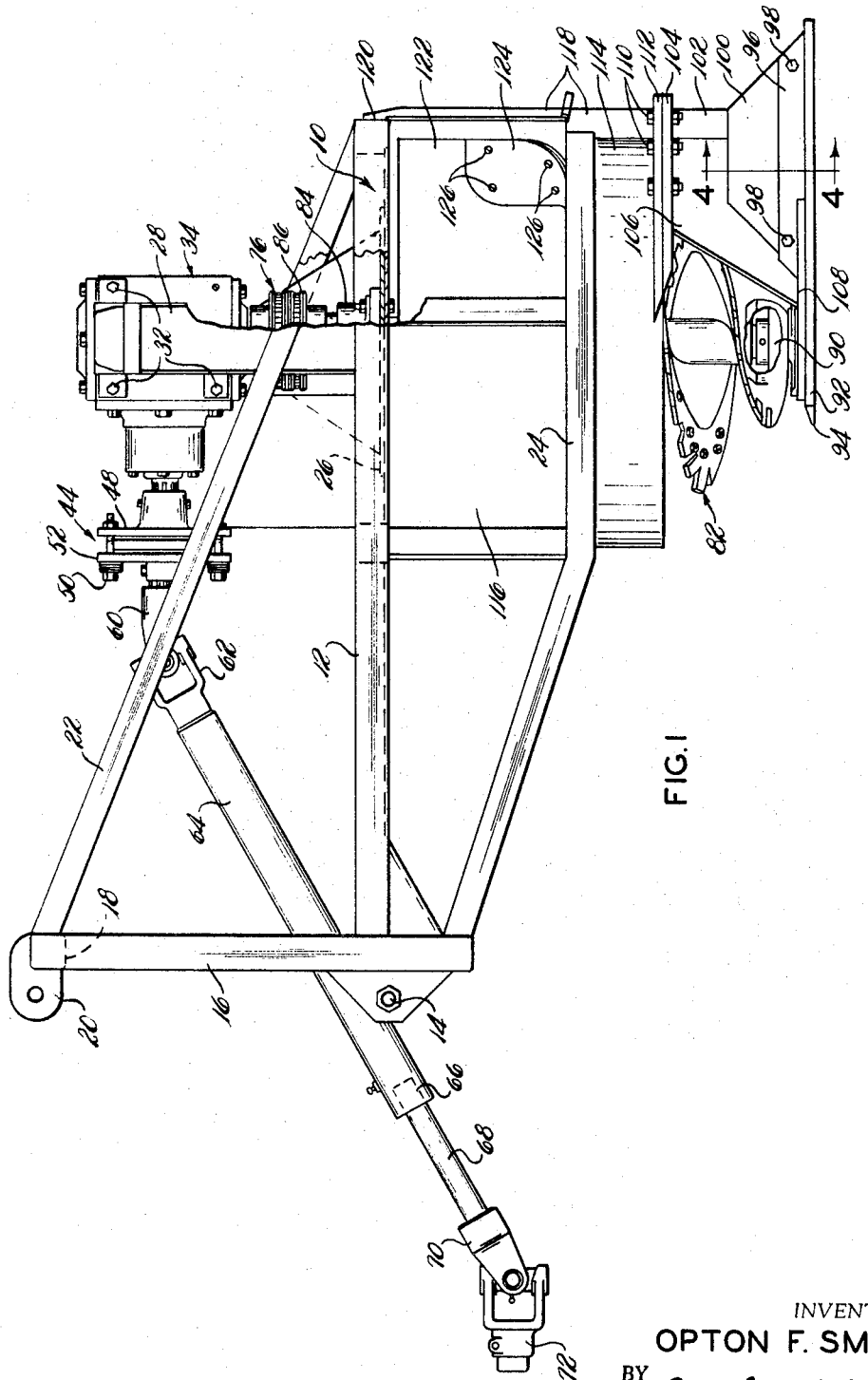
FIGURE 1 is a side elevation, partially broken away, of one best known embodiment of the apparatus of the invention.

Now referring to the drawings in greater detail, the numeral 10 indicates generally the frame of the apparatus this including a main frame 12 of substantially rectangular shape having secured at its forward ends laterally directed horizontal pins 14 for pivotal attachment to the two lower links of the three point attachment to the usual farm tractor to which the apparatus is adapted to be secured, but with the tractor not being shown. Secured to the front corners of the main frame 12 are vertically directed posts 16 to the upper ends of which is secured a cross bar 18 having a pair of apertured ears 20 at the center thereof which are adapted to be pivotally connected to the third link of the tractor mounting. Diagonally extending braces 22 connect the upper ends of the cross member 18 to the main frame 12. Likewise, secured to the main frame 12 is a sub-frame 24 which at its front end tapers upwardly to connect to the lower ends of the posts 16, and which at its rear end is in spaced parallel relation to the main frame 12.

Figure 6:
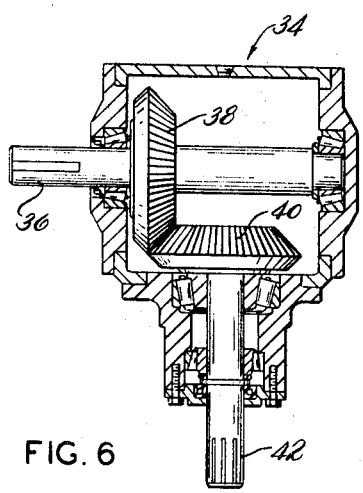
FIGURE 6 is a cross sectional view through the gear box of the apparatus.

Secured to the main frame 12 in the plane thereof and towards the middle back portion thereof is a plate 26 and extending upwardly from the plate are a pair of parallel channels 28 suitably braced by angle plates 30, the channels 28 being bolted at 32 to a gear box indicated as a whole by the numeral 34, the gear box 34 being shown in cross section in FIGURE 6.

Figure 7:
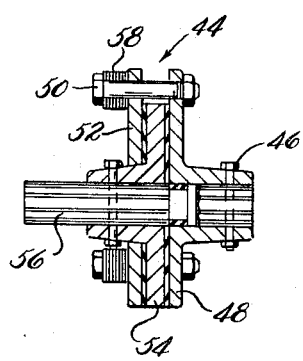
FIGURE 7 is a cross sectional view through the slip clutch incorporated in the drive of the apparatus.

The gear box 34 journals a forwardly extending shaft 36 driving a beveled gear 38 which engages with a beveled gear 40 secured to a downwardly extending shaft 42. The forwardly extending shaft 36 of the gear box 34 is connected to a slip clutch assembly 44 shown in cross section in FIGURE 7. The shaft 36 of the gear box 34 is connected by a bolt 46 to a plate 48 of the clutch having bolts 50, for example three, extending to a plate 52 so that when the bolts 50 are tightened the plates 48 and 52 frictionally grip a plate 54 secured to a splined shaft 56. Friction material of clutch facing type is positioned between the plate 54 and the plates 52 and 48, and compression springs 58 are usually provided on the bolts 50 so that the clutch will provide a drive from the splined shaft 56 to the forwardly extending shaft 36 of the gear box 34 until the clutch is overloaded at which time it will slip.

The forwardly extending splined shaft 56 of the slip clutch 44 is connected in a splined socket 60 connecting through a universal joint 62 to a hollow drive shaft 64 having a splined connection at 66 with a drive shaft 68 which in turn is connected to a universal joint 70 having a socket portion 72 which is adapted to be removably connected to the power take-off of the tractor (not shown) with which the trenching apparatus is to be used.

The downwardly extending shaft 42 of the gear box 34 is adapted to be connected by way of a flexible coupling 76 with the top end of the shaft 80 forming part of the screw or auger 82 incorporated with the apparatus. The shaft 80 of the screw 82 is journalled at its upper end in a bearing 84 mounted on the plate 26. The flexible coupling 76 preferably takes a form of a sprocket gear mounted on the lower end of shaft 42 and a sprocket gear mounted on the upper end of the shaft 80 with a link chain 86 bridging the gap between the sprocket gears and connecting the sprocket gears together in a manner that will be understood by the man skilled in the art.

Figure 2:
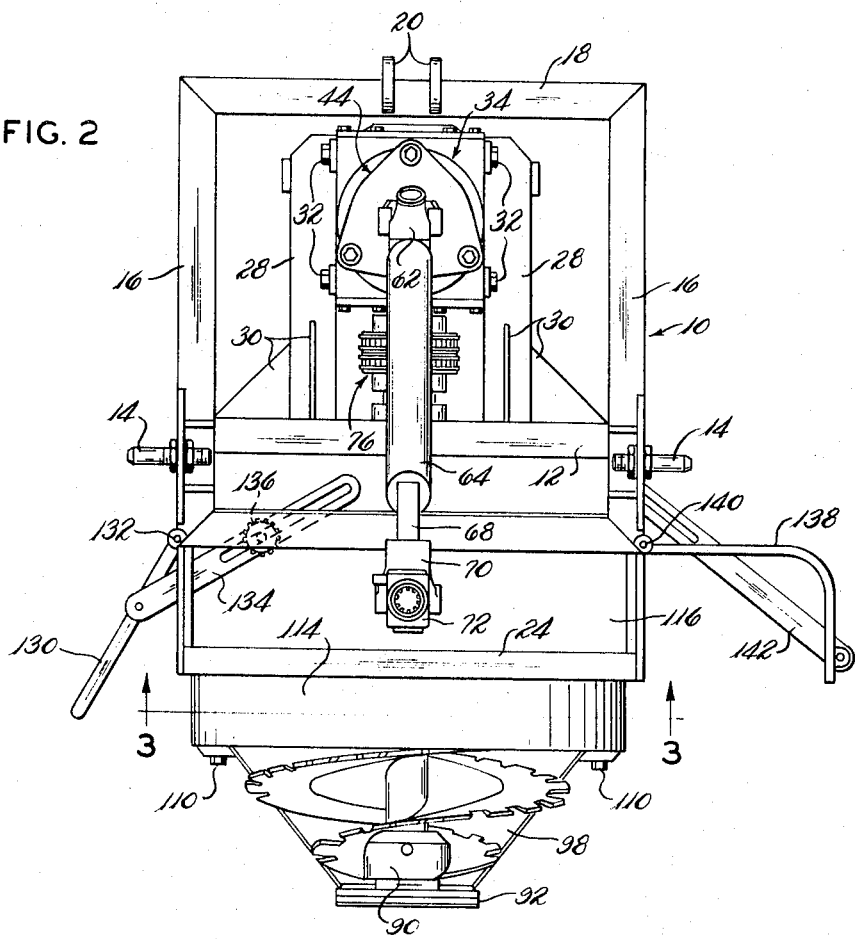
FIGURE 2 is an end view of the apparatus of FIGURE 1 and taken from the left hand end of FIGURE 1.

The lower end of the shaft 80 of the screw 82 is journalled in a bearing 90 mounted on a footer plate 92 having a sharp beveled front end 94 and of a width substantially equal to the width of the bottom of the trench to be dug by the apparatus and a length, as shown, extending from in front of the screw 82 to the rear of the frame 12, as best seen in FIGURE 1. The footer plate 92 has spaced flanges 96 welded to the rear portion thereof and these flanges are connected by bolts 98 to trapezoidal plates 100 welded to a channel 102 connected to a semi-circular plate 104. The trapezoidal plates 100 are also welded to the back side of a truncated conical housing 106 which is connected at its lower end at 108 to the footer plate 92 and which is welded at its upper end to the plate 104. The housing 106 in horizontal section at any vertical position is substantially half-round and closely surrounds the back of the screw 82, but with the edges of the screw extending laterally beyond the edges of the housing 98, as best seen in FIGURE 2. This means that the screw itself cuts the sides of the ditch or trench and the housing 98 serves only to guide upwardly the dirt cut loose by the screw 82.

The plate 104 forming part of the footer assembly, as previously described, is secured by bolts 110 to a similar half-round plate 112 secured to the bottom of an extension 114 of a substantially cylindrical casing 116 extending between the main frame 12 and the sub-frame 24. The extension 114 is also substantially cylindrical in shape, and both the extension 114 and the casing 116 are further strengthened by securing to the vertical back portion thereof, as by welding, a channel 118 which extends up and is secured to the main frame 12 at 120.

The screw 82 is formed with an upwardly increasing diameter, and generally, with an upwardly increasing pitch, the screw being generally of the type disclosed and claimed in my co-pending patent application Ser. No. 268,420, filed Mar. 27, 1963; now Patent No. 3,226,-855, and entitled "Earth Digging and Trenching Screw." The screw has cutting teeth formed on the outer periphery of the screw flights, usually in the nature of replaceable plates, and the screw is normally made with a plurality of flights, for example two, each of which terminates at its upper end in a radially directed paddle 122 secured to the shaft 80 of the screw, the paddles 122 being diametrically opposite and received in the substantially cylindrical casing 116.

One of the features of the present invention is to provide removable fillet plates 124 between the lower end of each paddle 122 and the upper end of the flight of the screw, these plates being removably held in position by countersunk screws 126 and serving to turn any dirt dug by the screw from the direction of vertical travel effected by the screw into a centrifugal throw in the cylinder 116. The fillet plates 124 can be readily replaced when worn.

The cylinder 116 is provided with lateral openings through which the dirt thrown by the paddles 122 is laterally discharged from the apparatus. FIGURE 2 illustrates how a closure door 130 pivoted at 132 and positioned adjustably by a brace 134 and a screw 136 controls a discharge opening at one side of the apparatus. FIGURE 2 also illustrates a guide closure 138 pivotally secured at 140 to the other side of the apparatus and adjusted as to position by a brace 142 serving to control the discharge of dirt through the opening in the casing 116 at the other side of the apparatus.

Figure 3:
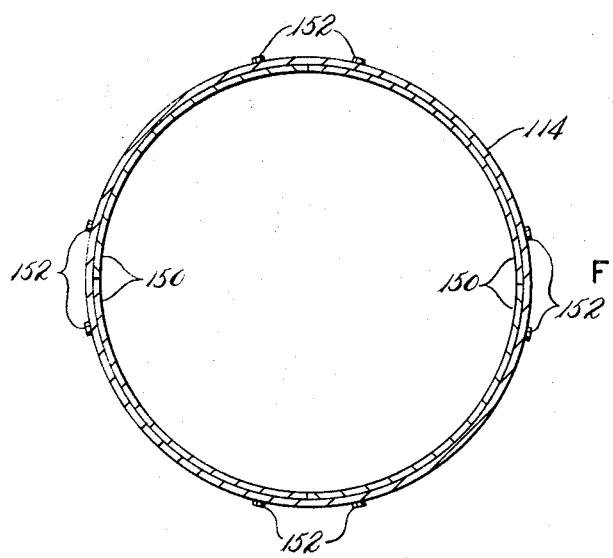
FIGURE 3 is a horizontal sectional view taken substantially on line 3—3 of FIGURE 2, but with the screw of the apparatus removed.
Figure 4:
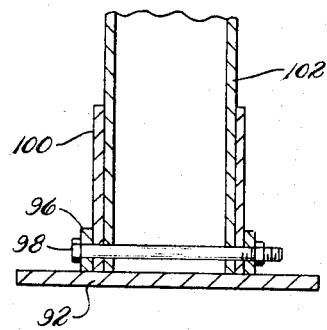
FIGURE 4 is a fragmentary vertical cross sectional view taken substantially on line 4—4 of FIGURE 1 and better illustrating the manner of connecting the footer plate to the assembly.
Figure 5:
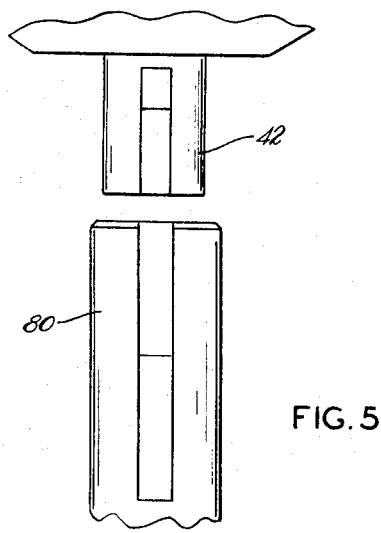
FIGURE 5 is a fragmentary and enlarged view of the screw shaft and the gear box shaft alignment with the resilient coupling removed.

FIGURE 3 illustrates how the extension 114 and the casing 116 is provided with removable liner plates 150 held in position by bolts 152 so that any serious wear on the inside of the extension and casing can be corrected by replacing the liner plates 150. The liner plates 150 usually extend up into the casing 116.

In the operation of the apparatus the trencher is positioned in an upright operating position behind the tractor with shaft 68 telescoped into drive shaft 64. The tractor is now backed to a position where the tractor three point hitch lower links can be pivotally attached to the pivot posts 14 of the trencher and lock pins installed. The tractor three point hitch adjustable upper link is now pivotally secured to the ears 20 of the trencher and a lock pin installed. The drive shaft 68 is now extended and member 72 is secured to the tractor power take-off shaft.

The tractor can now be operated to lift the trencher off the ground and to move the trencher to the desired operating position whereupon the trencher is lowered to ground level and the tractor lift mechanism is left in float position. The power take-off is now operated to drive the screw 82 and the tractor is started in first speed range and trenching is begun. As the tractor moves forward the trenching apparatus will move down into the earth floating upon the flotation pad 92 and with screw 82 cutting the dirt from the trench and moving it upwardly in the housing 106 and the extension 114 of the casing and hence into the casing 116 from where the dirt is centrifugally discharged through the lateral openings in the casing and in the manner guided by the deflector plates 130 and 138 to pile the dirt as desired at the sides of the trench.

Usually in a ditching operation where the apparatus is being employed to cut a drainage ditch or an irrigation ditch the deflector plates 130 and 138 are positioned to be entirely clear of the side openings of the casing 116 so that the dirt is thrown a considerable distance laterally of the trenching apparatus and is so effectively scattered over the considerable distance that no banks or shoulders are provided at the sides of the ditch which are upstanding above the normal ground level. However, when the apparatus is used to make a trench, for example, a trench in which a pipe or wire cable is to be buried, then the deflectors 130 and 138 are utilized so that the dirt is piled up in the form of a long row-like pile directly at the side of the trench so that after the pipe is placed in the trench it is a relatively simple matter to push the dirt back into the trench to cover the pipe. In one form of the apparatus utilized to lay plastic pipe the coil of plastic pipe in the form of a large spool can be carried on the tractor so that as soon as the trench is cut by the trenching apparatus the plastic pipe can be immediately and automatically laid in the trench by uncoiling the spool as the tractor and trenching apparatus moves forwardly.

Should the screw 82 strike an obstruction in the ground which might seriously overload the apparatus and cause breakage the clutch 44 will slip and the apparatus can be backed away and any obstruction removed manually. Substantially all portions of the trenching apparatus which wear in use can readily be replaced, all as aforesaid. The apparatus of the invention can be designed so as to cut relatively wide and flat drainage ditches or sharper sided and deeper trenches for laying pipe or wires. The forward speed of the tractor and the rotary speed of the screw can be adjusted to provide the maximum forward cutting movement in any particular soil and to the desired depth. The entire trenching apparatus in use floats on the plate 92 about the pivot posts 14 so that changes up or down hill of the surface of the ground do not effect the ditching or trenching operation. The extension 114 is adapted to ride just above the level of the ground at the sides of the ditch or trench.

While a certain representative embodiment and details have been shown for the purpose of illustrating the invention, it will be apparent to those skilled in this art that various changes and modifications may be made therein without departing from the spirit or scope of the invention.

What is claimed is:

1. A trenching apparatus for three point hitch attachment to a tractor and including a rectangular substantially horizontal frame, a horizontal pivot post extending laterally from each forward corner of the frame and adapted to be pivotally secured to the lower links of the tractor to allow the rear of the frame to float up and down about the posts, an upright at each forward corner of the frame, a cross bar joining the upper ends of the uprights, a pivotal connection at the center of the cross bar for joinder to the upper link of the tractor, diagonal bracing extending substantially from the ends of the cross bar to the frame, a plate secured to the rear of the frame in the plane thereof, a right angle gear box secured to the upper side of the plate and having one shaft extending vertically downward toward the plate and a second shaft extending horizontally forward of the box, a slip clutch secured to the second shaft, a universal coupling drive shaft secured to the clutch and adapted to be secured to the power drive unit of the tractor, a sub-frame secured on the underside of the frame, a cylindrical casing extending between the subframe and the frame in alignment with the gear box, said casing having opposed openings directed laterally, adjustable deflector means controllably closing the openings, a cylindrical extension of the casing directed below the subframe, a truncated conical housing secured to the bottom of the extension, a footer plate secured substantially horizontally to the bottom of the housing, a multi-flight screw of upwardly increasing diameter received in the extension and the housing, a bearing on the footer plate supporting the lower end of the screw, a bearing in the plate on the frame through which the upper end of the screw extends into alignment the one shaft of the gear box, a chain coupling connecting said one shaft and the upper end of the screw, radially-directed paddles in the casing secured to the screw shaft and connected to the upper ends of the flights of the screw, replaceable fillet-forming wear plates removably secured between each paddle and its screw flight, replaceable wear plates lining the extension of the casing, the housing having a semi-circular shape in any horizontal section and closely surrounding the rear of the screw but with the screw edges extending to each side of the housing, and channel-like means extending from the footer up to the frame to strengthen the footer, housing, extension, and casing.

2. A trenching apparatus for three point attachment to a tractor including a frame, pivotal means on the lower front of the frame for attachment to the lower links of the tractor, pivotal means on the upper front of the frame for attachment to the upper link of the tractor, a right angle gear box carried above the frame and having one shaft extending downwardly and a second shaft extending forwardly, an adjustable slip clutch connected to said second shaft, a universal drive shaft connected to the slip clutch and adapted to be connected to the power take-off of the tractor, a multi-flight screw, a bearing journalling the upper end of the screw shaft in the frame in alignment with said one shaft, flexible means coupling the screw to said one shaft, a cylindrical casing on the frame having lateral openings and surrounding the upper end of the screw shaft below the bearing, radially-directed paddles each connected to the upper end of a screw flight and on the screw shaft in the casing and adapted to throw dirt centrifugally through the openings, adjustably positioned deflectors over the openings, a cylindrical downward extension of the casing surrounding the upper end of the screw, a truncated conical half-round housing of less diameter than the screw connected to the bottom of the extension and surrounding the back of the lower portion of the screw, a footer plate on the bottom of the housing, a bearing on the plate supporting the lower end of the screw, means connecting the back of the footer plate, housing, extension, casing and frame to strengthen the assembly, removable liner means for the extension of the casing, and removable fillet means positioned in the corners between each paddle and the end of each screw flight.

3. A trenching apparatus for three point attachment to a tractor including a frame, pivotal means on the lower front of the frame for attachment to the lower links of the tractor, pivotal means on the upper front of the frame for attachment to the upper link of the tractor, a right angle gear box carried above the frame and having one shaft extending downwardly and a second shaft extending forwardly, a universal drive shaft connected to the second shaft and adapted to be connected to the power take-off of the tractor, a multi-flight screw, a bearing journally the upper end of the screw shaft in the frame in alignment with said one shaft, flexible means coupling the screw to said one shaft, a cylindrical casing on the frame having lateral openings and surrounding the upper end of the screw shaft below the bearing, radially-directed paddles each connected to the upper end of a screw flight and on the screw shaft in the casing and adapted to throw dirt centrifugally through the openings, adjustably positioned deflectors over the openings, a cylindrical downward extension of the casing surrounding the upper end of the screw, a truncated conical half-round housing of less diameter than the screw connected to the bottom of the extension and surrounding the back of the lower portion of the screw, a footer plate on the bottom of the housing, a bearing on the plate supporting the lower end of the screw, and means connecting the back of the footer plate, housing, extension, casing and frame to strengthen the assembly.

4. A trenching apparatus for three point attachment to a tractor and including a three point attachment frame, a screw of upwardly increasing diameter journalled vertically in the frame, means for driving the screw from the tractor, a footer plate mounted substantially horizontally below the frame, a substantially cylindrical casing on the frame surrounding part of the upper portion of the screw, a truncated conical housing extending between the footer plate and the casing and surrounding substantially the back half of the lower portion of the screw, a radially-directed paddle at the upper end of the screw for centrifugally throwing dirt dug by the screw, said casing having an opening through which the dirt is thrown, and a removable filler plate between the paddle and upper end of the screw.

5. A trenching apparatus for three point attachment to a tractor and including a three point attachment frame, a screw of upwardly increasing diameter journalled vertically in the frame, means for driving the screw from the tractor, a footer plate mounted substantially horizontally below the frame, a substantially cylindrical casing on the frame surrounding part of the upper portion of the screw, a truncated conical housing extending between the footer plate and the casing and surrounding substantially the back half of the lower portion of the screw, a radially-directed paddle at the upper end of the screw for centrifugally throwing dirt dug by the screw, said casing having an opening through which the dirt is thrown, and a removable multi-part lining for at least a portion of the casing.

References Cited

UNITED STATES PATENTS

| 1,147,373 | 7/1915 | Clark | 64—19 |
| 1,277,573 | 9/1918 | Hanneborg | 37—81 |
| 2,360,334 | 10/1944 | Engel et al. | 37—81 |
| 2,381,689 | 8/1945 | Roehr | 37—81 |
| 3,039,208 | 6/1962 | Oglesby et al. | 37—81 |

FOREIGN PATENTS

| 289,274 | 4/1928 | Great Britain. |
| 93,242 | 1/1959 | Norway. |

ANTONIO F. GUIDA, *Primary Examiner.*

ABRAHAM G. STONE, *Examiner.*

R. L. HOLLISTER, ALAN E. KOPECKI,
*Assistant Examiners.*